(12) United States Patent
Clifford

(10) Patent No.: US 6,738,609 B1
(45) Date of Patent: May 18, 2004

(54) RECEIVER AND METHOD OF RECEIVING

(75) Inventor: Paul Clifford, Fleet (GB)

(73) Assignee: Nokia Corporation, Espoo (FI)

( * ) Notice: Subject to any disclaimer, the term of this patent is extended or adjusted under 35 U.S.C. 154(b) by 651 days.

(21) Appl. No.: 09/641,285

(22) Filed: Aug. 17, 2000

Related U.S. Application Data

(63) Continuation of application No. PCT/GB99/04256, filed on Dec. 16, 1999.

(30) Foreign Application Priority Data

Dec. 21, 1998 (GB) ............................................. 9828230

(51) Int. Cl.⁷ ............................ H04B 1/10; H04L 27/06
(52) U.S. Cl. ................. 455/296; 455/250.1; 455/249.1; 342/433; 342/417; 375/316
(58) Field of Search .......................... 455/249.1, 250.1, 455/232.1, 234.1, 234.2, 296, 130–131, 137, 227, 561; 375/316; 333/117, 81 R; 342/417, 433

(56) References Cited

U.S. PATENT DOCUMENTS

| | | | | |
|---|---|---|---|---|
| 4,220,954 A | * | 9/1980 | Marchand | 342/433 |
| 4,332,032 A | * | 5/1982 | Daniel | 455/277.2 |
| 4,613,865 A | * | 9/1986 | Hoffman | 342/417 |
| 4,658,256 A | * | 4/1987 | Piele | 342/383 |
| 4,670,885 A | * | 6/1987 | Parl et al. | 455/276.1 |
| 5,125,108 A | * | 6/1992 | Talwar | 455/278.1 |
| 5,263,180 A | * | 11/1993 | Hirayama et al. | 455/139 |
| 5,630,223 A | * | 5/1997 | Bahu et al. | 455/296 |
| 5,974,040 A | * | 10/1999 | Kimura | 455/249.1 |
| 2002/0054651 A1 | * | 5/2002 | Posti | 375/316 |

FOREIGN PATENT DOCUMENTS

| | | |
|---|---|---|
| EP | 0 874 469 | 10/1998 |
| WO | 97/33377 | 9/1997 |
| WO | 98/21836 | 5/1998 |

OTHER PUBLICATIONS

12/98, International Search Report for PCT/GB99/04256.

* cited by examiner

*Primary Examiner*—Sinh Tran
*Assistant Examiner*—Kamran Afshar
(74) *Attorney, Agent, or Firm*—Squire, Sanders & Dempsey L.L.P.

(57) ABSTRACT

A receiver (9) for receiving a plurality of different signals at the same time, said receiver (9) comprising means for identifying at least one strongest signal of said plurality of different signals and means for attenuating said at least one strongest signal with respect to the other of said plurality of signals wherein the said attenuating means comprises hybrid means (140 and 160).

11 Claims, 5 Drawing Sheets

INTERFERENCE HARDENED RECEIVER FRONT END

CONTROLLER DECISIONS / INPUT

RECEIVER AND METHOD OF RECEIVING

This application is a continuation of international application serial number PCT/GB99/04256, filed Dec. 16, 1999.

FIELD OF INVENTION

The present invention relates to a receiver and a method of receiving and, in particular, but not exclusively, to a receiver and method of receiving for use in a wireless cellular telecommunications network.

BACKGROUND TO THE INVENTION

FIG. 1 illustrate a known wireless telecommunication network 2. The area covered by the network 2 is divided into a number of cells 4. Each cell 4 has associated therewith a base transceiver station 6. Each base transceiver station 6 is arranged to communicate with terminals 8 located in the cell 4 associated with that base transceiver station 6. The terminals 8 may be mobile stations which are able to move between the cells.

Each base transceiver station is, in the GSM standard (Global System for Mobile Communications), arranged to receive N frequency channels out of 125 available channels C1 . . . C1 25, as illustrated in FIG. 2a. The 125 frequencychannels C1 . . . C125 occupy a bandwidth of 25 MHz. Each frequency channel therefore has a width of 200 KHz. Each channel is divided into frames F one of which is shown in FIG. 2b. Each frame is divided into eight slots S1 . . . S8. The GSM standard is a time division multiple access (TDMA) system and accordingly different mobile stations will be allocated different slots. Thus, the base transceiver station will receive signals from different mobile stations in different time slots in the same frequency channel. N is usually much less than 125.

Reference is made to FIG. 4 which shows part of a known base transceiver station 9 which is arranged to receive N frequency channels at the same time. For clarity, only the receiving part of the base transceiver station 9 is shown. The base transceiver station 9 has an antenna 10 which is arranged to receive signals from mobile stations in the cell served by the base transceiver station 9. The base transceiver station comprises N receivers R1, R2 . . . RN. Thus one receiver is provided for each frequency channel which is to be received by the base station 9. All of the receivers R1-RN are the same and accordingly the components of the first receiver R1 only are shown.

The first receiver R1 comprises a first bandpass filter 12 which is arranged to filter out signals which fall outside the 25 MHz bandwidth in which the available channels are located. The filtered output is input to a first low noise amplifier 14 which amplifies the received signals. The amplified signal is then passed through a second bandpass filter 16 which filters out any noise, such as harmonics or the like introduced by the first amplifier 14. The output of the second bandpass filter 16 is connected to a mixer 18 which receives a second input from a local oscillator 20. The frequency of the output of the local oscillator 20 will depend on the frequency of the channel allocated to the particular receiver. The output of the second bandpass filter 16 is mixed with the output of the local oscillator 20 to provide a signal at an intermediate frequency IF, which is less than the radio frequency at which the signals are received. The intermediate frequency IF output by the mixer 18 of each receiver will be the same for all receivers and may, for example, be 180 MHz. For example, if the channel allocated to a given receiver has a frequency of 880 MHz then the local oscillator 20 of that receiver will be tuned to 700 MHz. On the other hand, if the channel allocated to a given receiver has a frequency of 900 MHz, then the local oscillator will be tuned to a frequency of 720 MHz.

The output of the mixer 18 is input to a third bandpass fitter 22 which filters out any noise introduced by the mixer 18. The output of the third bandpass filter 22 is amplified by a second amplifier 24 and output to a surface acoustic wave (SAW) filter 26 or another filter of an appropriate type. The surface acoustic wave filter 26 filters out all signals except that of the channel allocated to that particular receiver. In other words, all the channels received by the antenna 10 with the exception of the channel allocated to the receiver will be filtered out by the surface acoustic wave filter 26. The output of the 30 surface acoustic wave filter 26 is connected to an automatic gain control unit 28 which alters the gain of the signal so that it falls within the dynamic range of an analogue to digital converter 30.

One problem with the known architecture is that it is necessary to provide a receiver for each frequency.

With the known networks, the base transceiver station is required to receive signals from mobile stations 8 which are very close to the base transceiver station as well as from mobile stations 8 which are on the edge of a cell. Accordingly, the strength of the signals received by the base transceiver station will vary a great deal, depending on the distance between the mobile station and the base station. In this regard, reference is made to FIG. 2c which shows the signal received from eight mobile stations, on eight different channels at the same time. As can be seen, the signal from the fourth mobile station MS4 is very much stronger than the signal from the second mobile station MS2. The variation In the amplitude of the received signals gives rise to difficulties in the receiver.

If a single receiver were to be used with signals from more than one channel, amplifiers would have to amplify all of the signals received by the same amount at a given time including the signals with the larger amplitude and those of a smaller amplitude. The larger signals may therefore fall outside the dynamic range of the analogue to digital converter which may cause the analogue to digital converter to become saturated which lead to distortion. Typically, the distortion will take the form of intermodulation distortion which generates intermodulation product signals. This interference can interfere with signals received on other frequencies. If a lower amplification is used, this may result in the smaller signals being lost or swamped by background noise.

It is therefore an aim of some embodiments of the present invention to reduce or at least mitigate these problems.

SUMMARY OF THE INVENTION

According to one aspect of the present invention, there is provided a receiver for receiving a plurality of different signals at the same time, said receiver comprising means for identifying at least one strongest signal of said plurality of different signals; and means for attenuating said at least one strongest signal with respect to the other of said plurality of signals wherein the said attenuating means comprises hybrid means.

Thus, as the, at least one, strongest signal is identified and attenuated, the range of amplitudes of the signals which are provided for subsequent processing is reduced. This can avoid the problem of signals falling outside the dynamic range of, for example an analogue to digital converter.

Preferably, the attenuating means are arranged to allow signals which are not to be attenuated to pass therethrough substantially without change. This allows a single path to be provided for all signals with only the at least one strongest signal being attenuated, the other signals remaining substantially unchanged.

The plurality of different signals are preferably at different frequencies.

The hybrid means may be coupled to at least one tunable filter means, said at least one tunable filter means being tuned to a frequency of the signal to be attenuated. The tunable filter can take any suitable form and may be mechanical or electric. The frequency to which the at least one tunable filter is tuned may be controlled by the output of the identifying means. Preferably, at least one resistive load is connected to the hybrid means. Variation in the value of the resistive load may allow the degree of attenuation provided by the attenuation means to be controlled. The degree of attenuation provided may also be controlled by the tunable filter means.

The identifying means is preferably arranged to control the operation of the attenuating means. Thus, the identifying means preferably provide control signals which are used to control the attenuating means. For example, the identifying means may control the frequency to which the at least one tunable filter means, if provided, is tuned.

Preferably, a plurality of stronger signals are identified. The attenuating means may therefore attenuate a plurality of the strongest signals. In one embodiment of the present Invention, the two strongest signals are identified. However, it should be appreciated that more than two of the strongest signals can be identified.

Preferably, the identifying means is arranged to determine if the magnitude of said at least one strongest signal exceeds a threshold and the attenuating means is arranged to attenuate the at least one strongest signal only if the at least one strongest signal exceeds the threshold. Thus, signals which are not too large, despite being the strongest signals, are not unnecessarily attenuated.

Preferably, splitter means are arranged to provide two sets of signals from the plurality of different signals, each set containing all of the plurality of different signals. One set of the signals is preferably provided to the Identifying means whilst the other set of signals is provided to the attenuating means. The frequency of the set of signals provided to the identifying means may be reduced before the signals are provided thereto. This may be advantageous if the received signals are at a radio frequency and the identifying means requires the frequency of the signals to be at a lower frequency to obtain the required information.

A base station incorporating a receiver as described hereinbefore is preferably provided.

According to a second aspect of the present invention, there is provided a method of processing a plurality of different signals received at the same time, said method comprising the steps of identifying at least one strongest signal of said plurality of different signals; and attenuating said at least one strongest signal with respect to the other of said plurality of signals wherein attenuating method step uses hybrid means.

BRIEF DESCRIPTION OF THE DRAWING

For a better understanding of the present invention and as to how the same may be carried into effect reference will now be made by way of example to the accompanying drawings in which.

DETAILED DESCRIPTION OF PREFERRED EMBODIMENTS OF THE INVENTION

Figure 1:
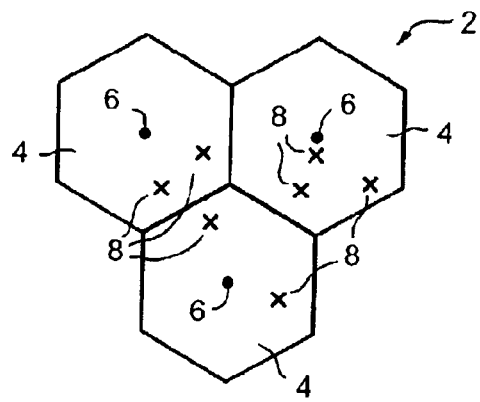
FIG. 1 shows a typical cellular telecommunication network.
Figure 3:
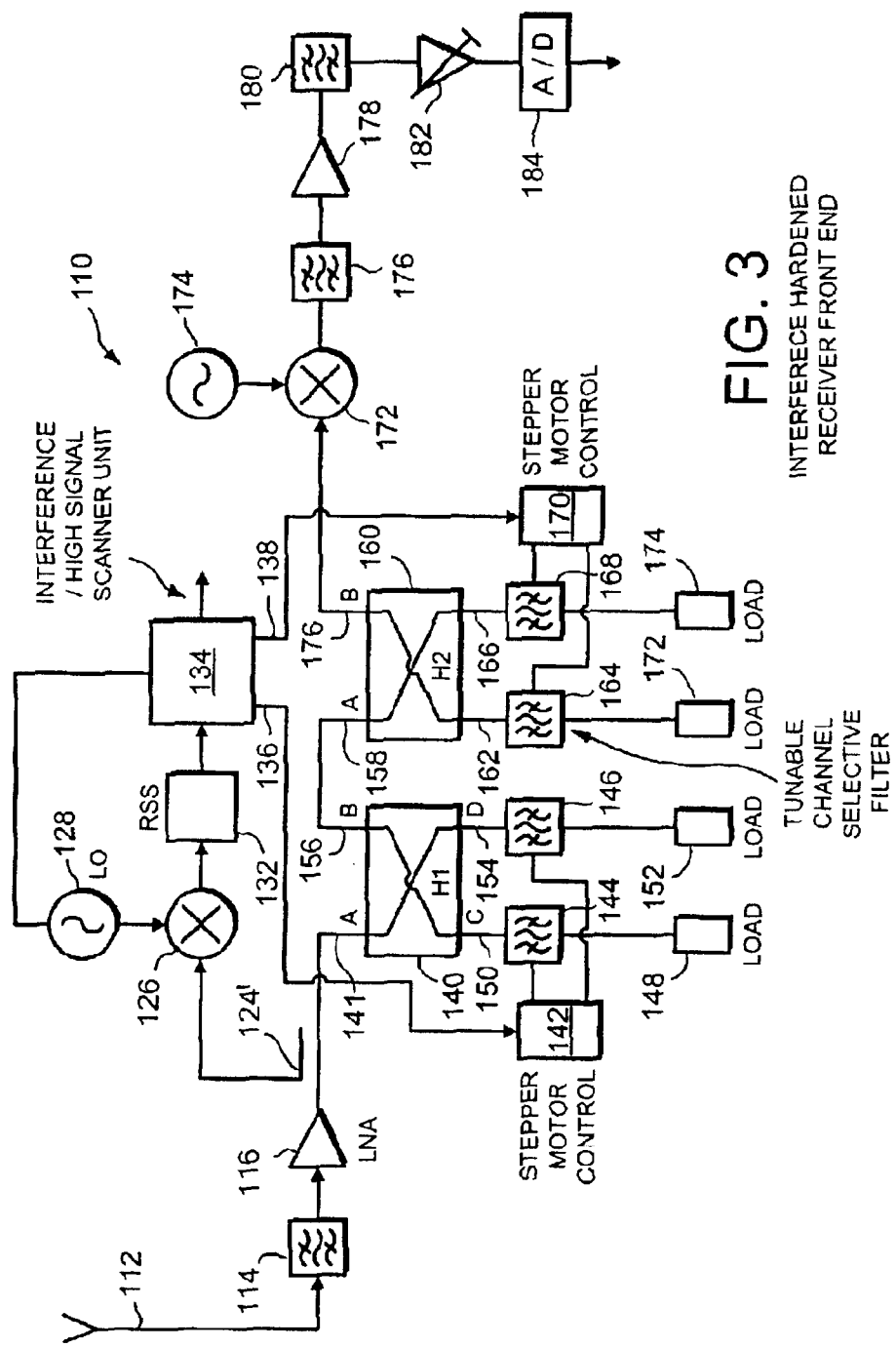
FIG. 3 shows a receiver embodying the present invention.
Figure 4:
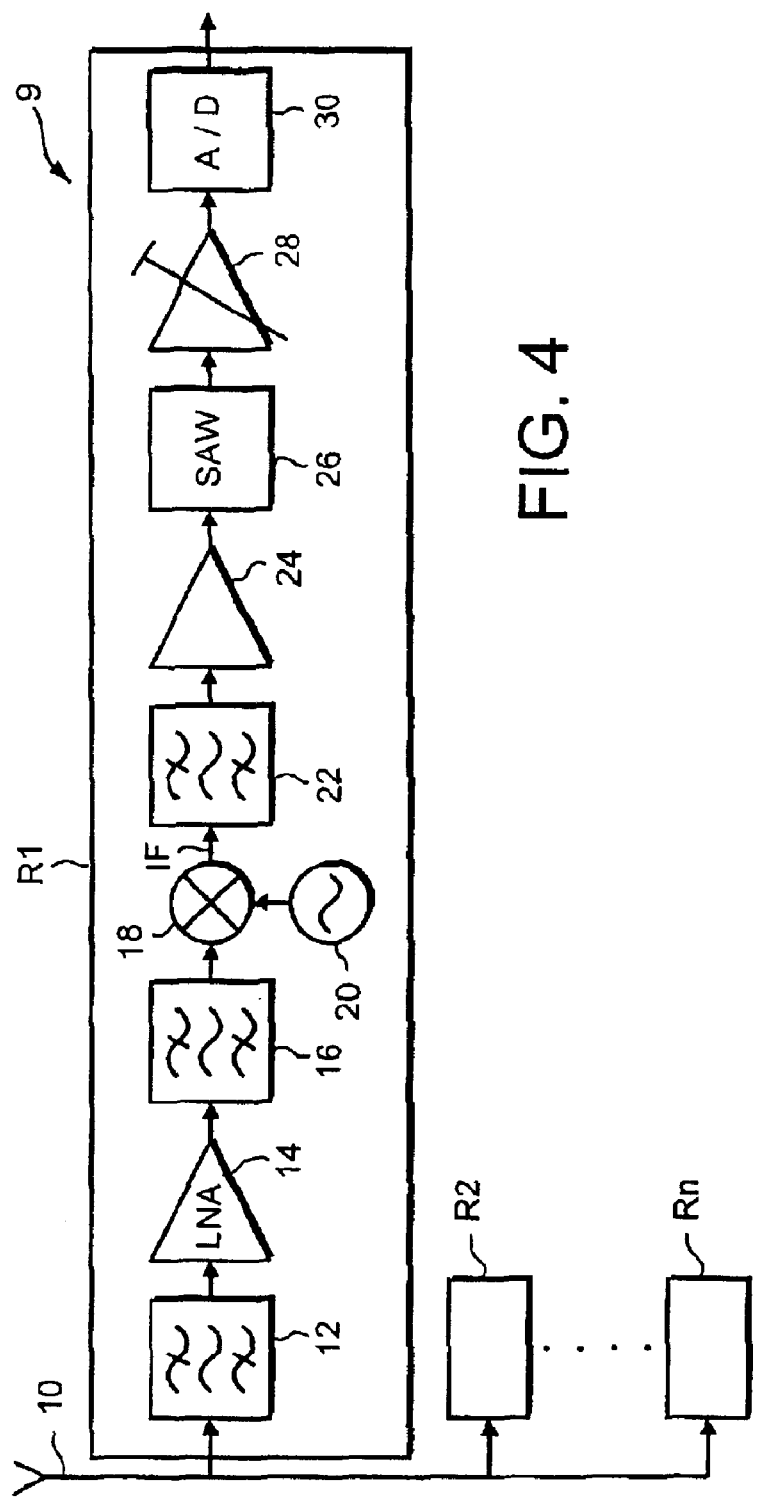
FIG. 4 shows a known base transceiver station.

FIG. 3 shows a receiver 110 incorporated in a base transceiver station in a network such as shown in FIG. 1. The embodiment illustrated in FIG. 3 will be described in the context of a GSM system. However, it should be appreciated that embodiments of the present application are also applicable to other standards.

The receiver 110 has an antenna 112 which is arranged to receive all of the signals from the mobile stations 8 in a cell associated with the base transceiver station. The antenna 112 is tuned to the 25 MHz bandwidth allocated to the base transceiver station and accordingly is able to receive signals on all of the N frequency channels out of 125 frequency channels C1–C125 available to the base station. The received signals from the antenna 112 are input to a bandpass filter 114 which filters out the signals which are not in the 25 MHz bandwidth allocated to the transmissions to base stations.

The filtered output of the bandpass filter 114 is input to a low noise amplifier 116. The low noise amplifier 16 amplifies the received signals on the N frequency channels.

The output of the low noise amplifier 116 is split into two parts by a splitter 124. Each of the two parts of the signals contains all of the received signals and the relative amplitude of the signals is retained in each part. The signals in the first part have a smaller amplitude than those in the second part The first part of the signals is input to a mixer 126. The mixer 126 receives a second input from a local oscillator 128. The frequency of the local oscillator 128 is controlled by a scanner unit 134 which will be discussed in more detail hereinafter. The oscillator 128 will provide the same number of frequencies as there are frequency channels. Thus N different frequencies are provided. The N different frequencies are all provided by the local oscillator 126 within a time slot period but at different times within the time slot to permit each of the different received signals to be sampled.

The mixer 126 thus mixes the first part of the signals with the N different frequencies, in turn, output by the local oscillator 128 to provide the received signals at intermediate frequencies. Since the received signals are at a plurality of different frequencies corresponding to the frequencies of the channels received by the base station, the mixing of these signals with a single given frequency from the local oscillator 128 will result in each of the received signals being downconverted to a different intermediate frequency. The oscillator frequencies are selected so that each of the N signals is downconverted so that a desired one of the N signals is always downconverted to the same given intermediate frequency. For example, with the first frequency provided by the local oscillator 128, the signal corresponding to the first channel in the first part of the signal is downconverted to the given intermediate frequency, with the second frequency provided by the local oscillator 128, the second channel is downconverted to the given intermediate frequency.

The signal which is input to the mixer 126 from the low noise amplifier 116 is at the radio frequency.

The output of the mixer 126 is input to a received signal strength (RSS) unit 132 which determines the strength of each signal received in each of the N channels received by the base station. It should be appreciated that as signals are received from different mobile stations in different time slots on the same channel, the strength of the signal on a given channel will not remain constant and can change as often as every time slot.

Figure 5:
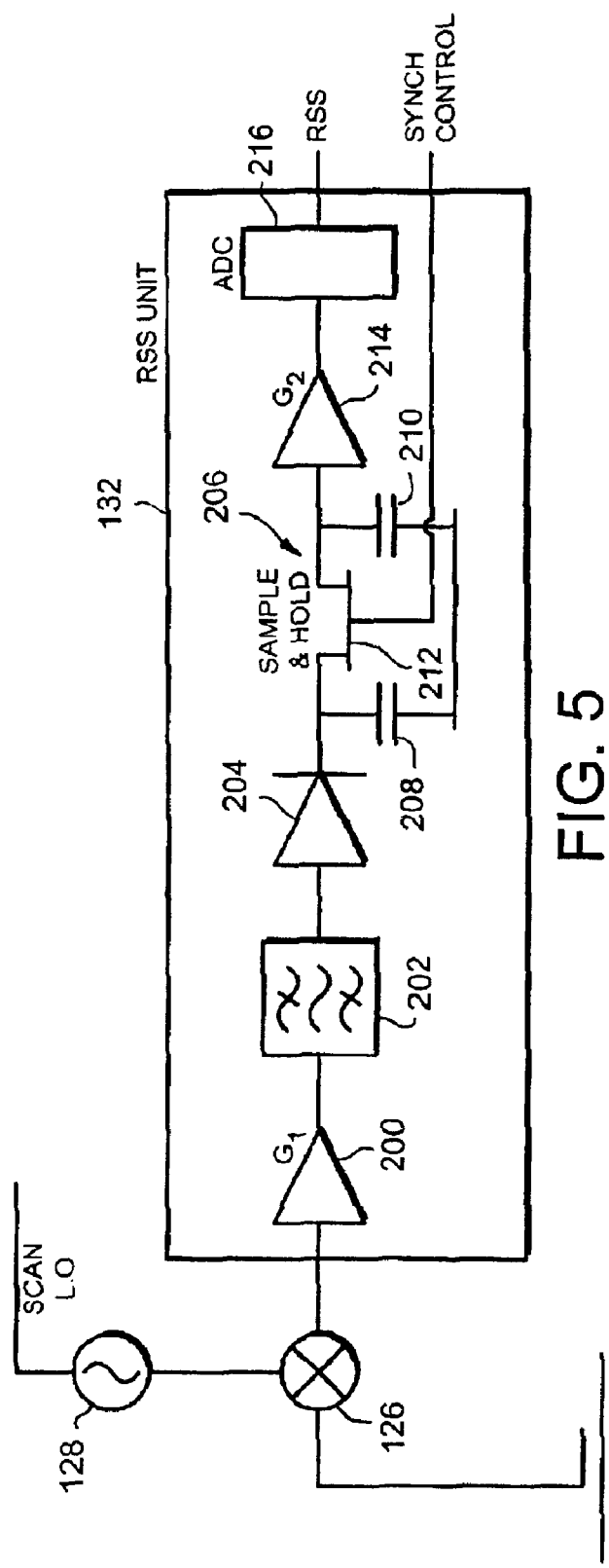
FIG. 5 shows the received signal strength unit of FIG. 3 in more detail.

The received signal strength unit 132 will now be described in more detail with reference to FIG. 5. The received signal unit 132 receives the output from the mixer 126. The output of the mixer 126 is input to a first buffer 200. The output of the first buffer 200 is input to a bandpass filter 202. The bandpass filter is tuned to the given intermediate frequency. The bandwidth of the bandpass filter 202 is selected so that all the signals other than that at the given intermediate frequency are removed. Thus, the output of the bandpass filter 202 provides, In turn, a downconverted version of each of the N channels without the other channels. The output of the bandpass filter is connected to a diode 204. The output of the diode is connected to a sample and hold circuit 206. The diode 204 is arranged to prevent feedback from the sample and hold circuit to the bandpass filter 202.

The sample and hold circuit 206 is entirely conventional and comprises first and second capacitors 208 and 210 and a field effect transistor 212. The field effect transistor 212 receives a control input from the scanner unit 134. The transistor 212 effectively acts as a switch which is controlled to be either on or off by the control input. In a known manner, the samples for each of the channels is held by the sample and hold circuit 206 so that the size of the signals in each of the channels can be determined. The output of the sample and hold circuit 206 is connected to a second buffer 214. The first and second buffers 200 and 214 effectively form part of the sample and hold circuit. The output of the second buffer 214 is input to an analogue to digital converter 216 which converts each of the samples into a digital form. The magnitude of each of the samples represents the strength of each of the signals in each of the channels.

The information on the strength of each signal determined by the RSS unit 132 is output to the scanner unit 134. The scanner unit 134 determines for each time slot which two channels of the N channels received by the base station have the strongest signals. If the two strongest signals exceed a predetermined threshold level, then the scanner unit 134 will provide two outputs 136 and 138. One of the signal will include information as to the channel on which one of the strongest signals has been received which the other channel will include information as to the channel on which the other of the strongest signals has been received. It should be noted that if only one of the two strongest signals exceeds the predetermined threshold, then only one output is provided. If neither of the two strongest signals exceeds the threshold, then no output is provided by the scanner unit 134. The two outputs 136 and 138 will be described in more detail hereinafter. In one alternative, instead of providing no output when one or both of the two signals does not exceed the threshold, a different output is provided on the outputs 136 and 138 indicative of this.

Figure 6:
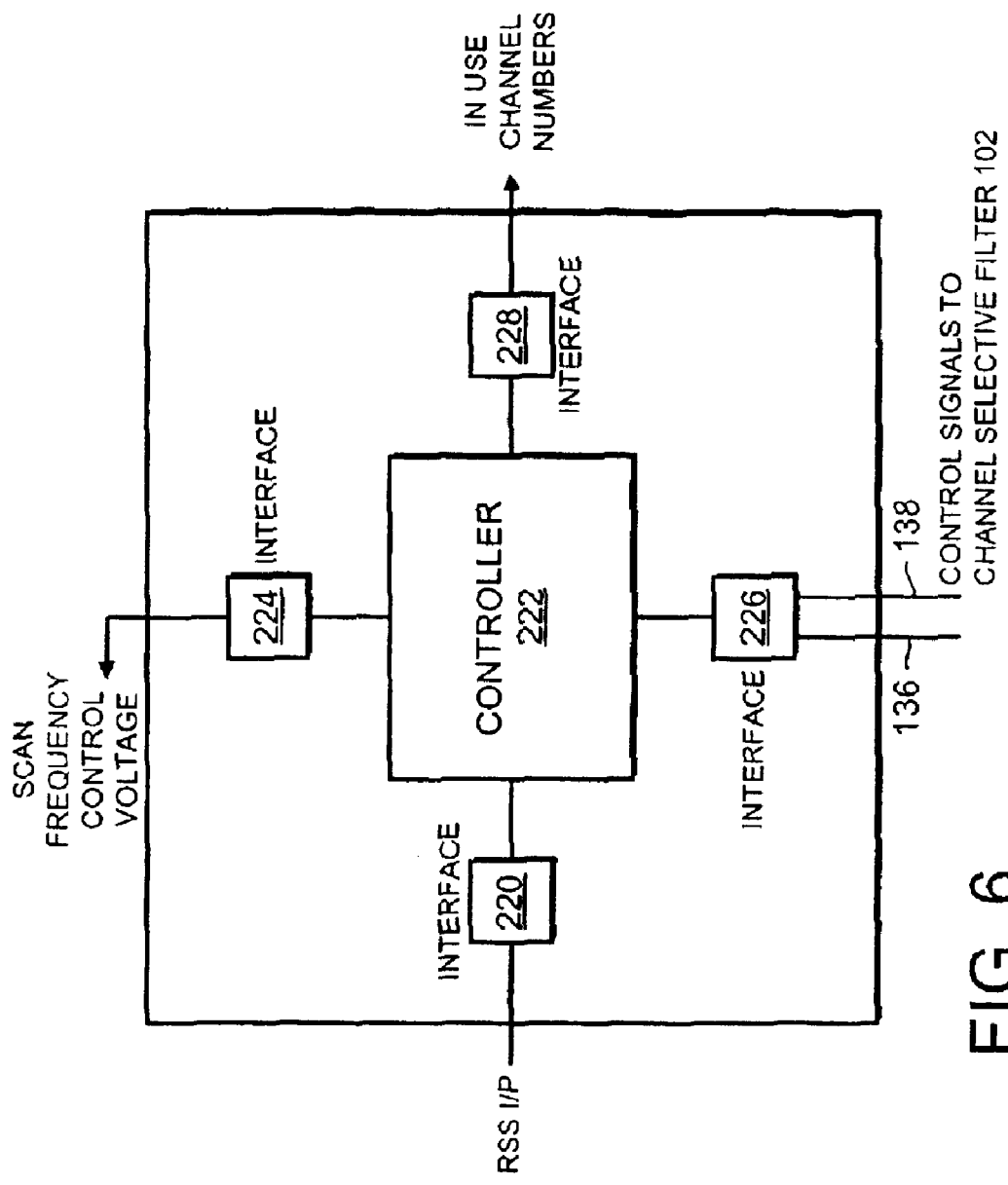
FIG. 6 shows the scanner unit of FIG. 3 in more detail.

Reference will now be made to FIG. 6 which shows the scanner unit 134 in more detail.

The output of the receive signal strength unit 132 is input to a first interface 220 which outputs the received samples including the strength information to a controller 222. The controller 222 can take any appropriate form and may for example be a microprocessor. The controller 222 is arranged to control the frequencies provided by the local oscillator 128. The control signals for controlling the local oscillator 128 are output by the controller to the local oscillator 128 via a second interface 224. The controller outputs via a third interface 226 control signals to control the frequency of the tunable filters which will be described in more detail hereinafter. These control signals correspond to the two strongest signals as described hereinbefore. Finally, the scanner unit 134 has a fourth interface 228 which provides an indication as to the number of channels which are in use. This can be determined by determining the number of channels which have a signal strength above a predetermined threshold. Below that threshold, the signal strength can be attributed for example to noise.

Figure 2A:
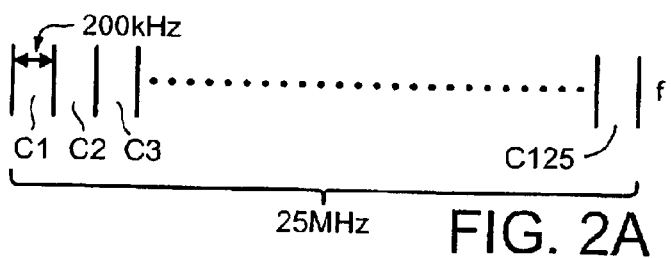
FIG. 2a shows the channel structure in a GSM system.
Figure 2B:
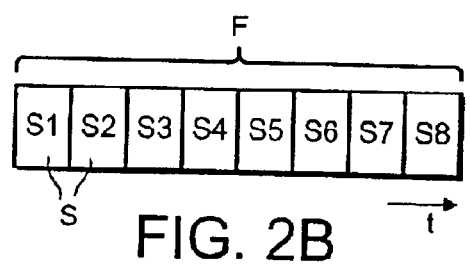
FIG. 2b shows the frame and slot structure used in each channel.
Figure 2C:
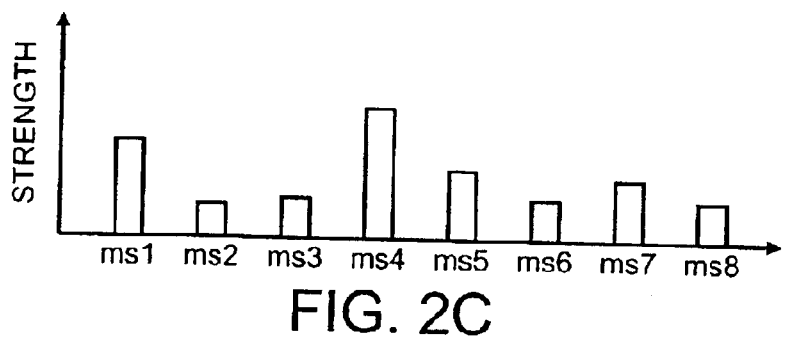
FIG. 2c shows the strength of signals received from different mobile stations.

The second part of the signals output by the splitter 124 is connected to the first port 141 of a first 90° quadrature coupler 140 which is sometimes referred to as a hybrid coupler. The first port 141 provides the input to the first hybrid 140. The first output 136 of the scanner 134 is used to control a stepper motor 142. The stepper motor 142 is used to adjust the frequency to which a first and a second tunable bandpass filter 144 and 146 are tuned. The first output 136 from the scanner unit 134 causes the stepper motor 142 to tune the first and second tunable bandpass filters 144 and 146 to the frequency of the channel in which one of the strongest signals has been received. For example, if the signal from mobile station MS4 (see FIG. 2c) is received on channel C4, the tunable first and second bandpass filters will be tuned to the frequency of channel C4.

The first tunable filter 144 is connected between a first resistive load 148 and a second port 150 of the first hybrid 140. The second tunable bandpass filter 146 is connected between a second resistive load 152 and a third port 154 of the hybrid. The first hybrid 140 has a fourth port 156 which provides the output of the first hybrid 140. The fourth port 156 is coupled to the second port 150 which is connected to the first tunable bandpass filter 144. The third port 154 connected to the second tunable bandpass filter 146 is coupled to the first port 141 of the first hybrid 140.

The output fourth port 156 of the hybrid 140 is connected to the first port 158 of a second hybrid 160. The first port 158 provides the input to the second hybrid 160. A second port 162 of the second hybrid 160 is connected to a third tunable filter 164 whilst a third port 166 is connected to a fourth tunable bandpass filter 68. The third and fourth tunable bandpass filters 164 and 168 are connected to a stepper motor 170 which controls the frequency to which the third and fourth tunable bandpass filters 164 and 168 are tuned. The stepper motor 170 receives the second output 138 from the scanner 134. The second output 138 causes the stepper motor 170 to tune the third and fourth tunable bandpass filters 164 and 168 to the channel with the other strongest signal identified by the scanner 134.

The third tunable filter 164 is connected between a third resistive load 172 and the second port 162 of the second hybrid 160 whilst the fourth tunable filter 168 is connected between a fourth resistive load 174 and the third port 166 of the second hybrid 160. The output of the second hybrid 160 is provided by a fourth port 176. The first port 158 of the second hybrid is coupled to the third port 166 whilst the second port 162 is coupled to the fourth port 160. The output of the second hybrid 160 is output to a down converter 172. The downconverter in the form of the mixer 172 receives an input from a second local oscillator 174. The output of the second local oscillator 174 is mixed with the output from the second hybrid 160 to provide signals at intermediate frequencies. The frequency provided by the second oscillator 174 remains fixed. The received signals are thus downconverted to different intermediate frequencies. The output of the mixer 172 is input to a bandpass filter which is tuned to permit the received signals, downconverted to the intermediate frequency, to pass therethrough.

Extraneous noise and the like introduced by the mixer 172 is removed. The output of the bandpass filter 176 is input to an amplifier 178 which amplifies all of the signals by the same amount. The output of the amplifier 178 is introduced to a further bandpass filter 180 which removes any noise introduced by the amplifier 178. All of the desired signals are passed through the further bandpass filter 180. The output of the bandpass filter may be input to a automatic gain control unit 182. The automatic gain control unit 182 may alter the gain of the signals so that they fall within the dynamic range of the analogue to digital converter 184 connected to the output thereof. As the strongest signals have been attenuated, the automatic gain control unit 182 is generally able to ensure that all signals including the largest and smallest amplitude signals fall within the range of the analogue to digital converter 184.

The first and second outputs 136 and 138 provided by the scanner unit 134 thus provide control signals for the first and second stepper motors 142 and 170 respectively. The first control signal provided by the first output 136 causes the first stepper motor to tune the first and second tunable filters 144 and 146 to the frequency of one of the channels on which one of the strongest signals is received. Likewise, the second control signal 138 provided by the scanner unit 134 is used to control the second stepper motor 170 to tune the third and fourth tunable filters 164 and 168 to the frequency of the channel on which the other of the strongest signals is received.

Before going on to describe the operation of the embodiment of the invention, the hybrid shown in FIG. 3 will now be discussed in more detail. The 90° hybrid is a reciprocal four port device. The critical physical lengths of the hybrid are made equal to a quarter of the electric wavelength. The critical transmission line impedances are set to Zo and Zo/Zo$^{1/2}$ where Zo is the output impedance and may for example be 50W. Equal 30 amplitude outputs result when a signal is fed to one of the inputs. One output will be in phase with the input signal whilst the other output will be –90° out of phase with the input signal. Opposite ports of the 90° hybrid will be isolated. Reference is made to the table below which explains the operation of the hybrid.

|   | A | B | C | D |
|---|---|---|---|---|
| A | 1/P | 0 | –3 dB | –3 dB |
| B | 0 | 1£ | –3 dB | –3 dB |
| C | –3 dB | –3 dB | 1£ | 0 |
| D | –3 dB | –3 dB | 0 | 1£ |

For the purpose of this example, A represents port 141, B represents port 156, C represents port 150 and D represents port 154 of the first hybrid of the example shown in FIG. 3. Thus, it can be seen that a signal applied to any input will result in two quadrature or 90° outputs. Ports A and B and ports C and D are isolated. Consider the case where an input is applied to port A. Ports C and D are terminated (i.e. provide no output) and the voltage amplitude at port B is zero. If port C and D are not terminated by a perfect impedance Zo. then a resultant voltage will appear at port B dependent on the mismatch between output impedance of the device and the termination impedance. If C and D are completely mismatched from the impedance view point, then the full voltage minus device losses will be seen at port B.

If the impedance Zo of ports C and D is frequency dependent, then the device will behave as a divider only at the resonant frequency and related bandwidth of resonance. At all other frequencies, the input voltage will appear at port B as illustrated in table 2 below.

|   | A | B | C | D |
|---|---|---|---|---|
| A | 1/P | O/P | O | O |
| B | O/P | 1/p | O | O |

The operation of the receiver 10 shown in FIG. 3 will now be described.

The signals which are received by the antenna 112 are filtered by the bandpass filter 114 to remove any signals which are outside the allocated bandwidth for signals to be received by the base station. The signals within the allocated bandwidth and representing the N channels are amplified by the low noise amplifier 116 and split into two parts. One part of the signals are down converted by the mixer 126 from the radio frequency to an intermediate frequency. The down conversion occurs as the received signals are mixed with the output of the local oscillator 128.

The RSS unit 132 measures the strength of each signal received in each of the N channels. This information is output to the scanning unit 132 which determines which two channels contain the strongest signals. The scanning unit 134 then outputs a control signal via the first output 136 to cause the first and second tunable filters 144 and 146 to be tuned to one of the channels containing one of the strongest signals. The tuning of the first and second tunable filters 144 and 146 is controlled by the first stepper motor 144. Likewise, a second control signal is output by the scanner unit 134 via the second output 138 which controls the third and fourth tunable filters 164 and 168 to be tuned to the frequency of the other of the channels in which the other of the strongest signals is received. The tuning of the third and fourth tunable filters 164 and 166 is controlled by the second stepper motor 170.

The second part of the signals passes from the splitter 124 to the first port 141 of the first hybrid 140. The channels at the frequencies other than the frequency to which the first and second tunable filters 144 and 146 are tuned will pass, substantially without loss, from the first port 141 to the output port 156. However, the signal in the channel at the frequency to which the first and second tunable filters 144 and 146 are tuned will be passed from the first port 141 to the second and third ports 150 and 154. Part of the signal will be reflected to the output port 156 whilst part of the signal will be dissipated in the first and second resistive loads 148 and 152. Thus, the signal in the channel at the frequency to which the first and second tunable filters 144 and 146 are tuned will be attenuated. The signal in this channel is one of the two largest identified by the scanner unit 134. The degree of attenuation can be selected as required by varying the value of the first and second resistive loads 148 and 152 and the filter construction. Typically the first and second resistive loads 148 and 152 will have the same value. The degree of attenuation may, for example, be of the order of 20 decibels.

The second hybrid 160 in exactly the same way, attenuates the signal in the channel to which the third and fourth tunable filters 164 and 168 are tuned whilst allowing signals in the channels not at the frequency to which the third and fourth filters 164 and 168 are tuned to pass unaltered through the second hybrid 160. In this way, the signals output from the fourth port 160 of the second hybrid 176 will include the signals from all N channels received by the base station. However, the two strongest signals will have been attenuated and thus unlikely to drive the analogue to digital converter 184 into saturation which, as mentioned hereinbefore, can give rise to interference.

The filter shown in the embodiment of FIG. 3 is a cavity tuned filter. However, any other suitable filter could be used. For example, a surface acoustic wave filter may be used or other types of mechanical or electrically tuned filters. The filter may use superconductor technology.

The embodiment shown in FIG. 3 is described as having two hybrid couplers so that the signals on two channels can be attenuated. However, it is possible that more or less than two signals can be attenuated. This will depend on the number of hybrid arrangements provided.

In one modification to the embodiment shown in FIG. 3, if none of the signals exceeds the predetermined threshold of the scanner unit, then the four tunable filters 144, 146, 164 and 168 can be tuned to a frequency outside the 25 MHz range so that all signals are passed through, without attenuation, the two hybrid couplers 140 and 160.

Whilst embodiments of the present invention have been described in relation to a GSM system, embodiments of the present invention can be used with any other suitable standard including analogue standards, other standards using time division multiple access (TDMA) spread spectrum systems such as code division multiple access (CDMA), frequency division multiple access (FDMA), space division multiple access (SDMA) and hybrids of any of these systems.

Embodiments of the present invention have been described in the context of a receiver for a base transceiver station. However, embodiments of the present invention can be used in any suitable receiver such as in a mobile station as well as in other types of receiver which are not used in cellular networks but which are arranged to receive a number of signals at the same time.

What is claimed is:

1. A receiver for receiving a plurality of different signals at the same time, receiver comprising: means for identifying at least one strongest signal of said plurality of different signals received at the same time; and means for attenuating said at least one strongest signal with respect to others of said plurality of different signals wherein said attenuating means comprises hybrid means, wherein the hybrid means is coupled to at least one tunable filter means, wherein said at least one tunable filter means being tuned to a frequency of a signal to be attenuated, wherein at least one resistive load is connected to the hybrid means.

2. A receiver as claimed in claim 1, wherein the attenuating means is arranged to allow signals which are not to be attenuated to pass therethrough substantially without change.

3. A receiver as claimed in claim 1, wherein the plurality of different signals are at different frequencies.

4. A receiver as claimed in claim 3, wherein the frequency to which the at least one tunable filter is tuned is controlled by an output of the identifying means.

5. A receiver as claimed in claim 1, wherein the identifying means is arranged to control the operation of the attenuating means.

6. A receiver as claimed in claim 1, wherein a plurality of strongest signals are identified.

7. A receiver as claimed in claim 1, wherein the identifying means is arranged to determine if magnitude of said at least one strongest signal exceeds a threshold and the attenuating means is arranged to attenuate the at least one strongest signal only if the at least one strongest signal exceeds said threshold.

8. A receiver as claimed in claim 1, wherein splitter means are arranged to provide two sets of signals from said plurality of different signals, each set containing all of the plurality of different signals, one set of the signals being provided to the identifying means while the other set of signals being provided to the attenuating means.

9. A receiver as claimed in claim 8, wherein the frequency said of one set of signals is reduced before said signals are provided to said identifying means.

10. A base station incorporating a receiver as claimed in claim 1.

11. A method of processing a plurality of different signals received at the same time, said method comprising the steps of: identifying at least one strongest signal of said plurality of different signals received at the same time; and attenuating said at least one strongest signal with respect to others of said plurality of different signals wherein the attenuating method step uses hybrid means, wherein the hybrid means is coupled to at least one tunable filter means, wherein said at least one tunable filter means being tuned to a frequency of a signal to be attenuated, wherein at least one resistive load is connected to the hybrid means.

* * * * *